United States Patent
Lim et al.

(10) Patent No.: US 11,384,234 B2
(45) Date of Patent: Jul. 12, 2022

(54) CROSSLINKABLE POLYMER COMPOSITION COMPRISING POLYMER BLEND OF EVA COPOLYMER AND EMA COPOLYMER

(71) Applicant: NEXANS, Courbevoie (FR)

(72) Inventors: Jong-Chan Lim, Chungcheongbuk-do (KR); Seong-Jin Kim, Chungcheongbuk-do (KR); Kwon-Soon Kim, Chungcheongbuk-do (KR)

(73) Assignee: Nexans, Courbevoie (FR)

( * ) Notice: Subject to any disclaimer, the term of this patent is extended or adjusted under 35 U.S.C. 154(b) by 37 days.

(21) Appl. No.: 16/319,075

(22) PCT Filed: May 19, 2017

(86) PCT No.: PCT/IB2017/000820
§ 371 (c)(1),
(2) Date: Jan. 18, 2019

(87) PCT Pub. No.: WO2018/015798
PCT Pub. Date: Jan. 25, 2018

(65) Prior Publication Data
US 2021/0347975 A1    Nov. 11, 2021

(30) Foreign Application Priority Data
Jul. 22, 2016 (KR) .......... 10-2016-0093352

(51) Int. Cl.
| | | |
|---|---|---|
| *C08L 33/08* | (2006.01) | |
| *C08L 23/08* | (2006.01) | |
| *H01B 3/44* | (2006.01) | |
| *H01B 7/295* | (2006.01) | |

(52) U.S. Cl.
CPC ........... *C08L 33/08* (2013.01); *C08L 23/0853* (2013.01); *C08L 23/0869* (2013.01); *H01B 3/441* (2013.01); *H01B 3/447* (2013.01); *C08L 2201/02* (2013.01); *C08L 2201/08* (2013.01); *C08L 2203/202* (2013.01); *C08L 2205/06* (2013.01); *C08L 2312/00* (2013.01); *H01B 7/295* (2013.01)

(58) Field of Classification Search
CPC ........ H01B 3/441; H01B 3/447; H01B 7/295; H01B 3/448; C08K 3/013; C08K 3/22; C08K 5/14; C08L 33/08; C08L 23/0853; C08L 23/0869; C08L 2201/02; C08L 2201/08; C08L 2203/202; C08L 2205/202; C08L 2205/06; C08L 2666/84; C08L 2312/00
USPC ......................................................... 523/206
See application file for complete search history.

(56) References Cited

U.S. PATENT DOCUMENTS

| | | | |
|---|---|---|---|
| 2004/0039108 A1* | 2/2004 | Nishihara | C08K 5/01 524/543 |
| 2009/0301751 A1 | 12/2009 | Iwasaki et al. | |
| 2012/0132457 A1* | 5/2012 | Tai | C08G 18/4854 174/110 SR |
| 2016/0125973 A1* | 5/2016 | Iwasaki | H01B 3/441 428/383 |
| 2017/0149151 A1* | 5/2017 | Allais | H01R 4/726 |
| 2021/0166837 A1* | 6/2021 | Ahn | C08L 23/0853 |

FOREIGN PATENT DOCUMENTS

| | | |
|---|---|---|
| CN | 85104671 | 12/1986 |
| GB | 2149802 | 6/1985 |
| KR | 101256800 | 4/2013 |

OTHER PUBLICATIONS

International Search Report dated Sep. 18, 2017.
Chinese Office Action dated Dec. 30, 2020.

* cited by examiner

*Primary Examiner* — Hannah J Pak
(74) *Attorney, Agent, or Firm* — Sofer & Haroun, LLP

(57) ABSTRACT

The present invention relates to a crosslinkable polymer composition for use as a sheath layer of cable, and to a cable comprising a crosslinked layer obtained from said composition. The crosslinkable polymer composition according to the present invention comprises a polymer blend of ethylene vinyl acetate copolymer and ethylene methyl acrylate copolymer, a flame retardant filler and a crosslinking agent.

7 Claims, No Drawings

CROSSLINKABLE POLYMER COMPOSITION COMPRISING POLYMER BLEND OF EVA COPOLYMER AND EMA COPOLYMER

RELATED APPLICATIONS

This application is a National Phase Application of PCT/IB2017/000820 filed on May 19, 2017, which in turn claims the benefit of priority from Korean Patent Application No. 10-2016-0093352, filed on Jul. 22, 2016, the entirety of which are incorporated herein by reference.

FIELD OF THE INVENTION

The present invention relates to a crosslinkable polymer composition, more preferably for use as a sheath layer, comprising a polymer blend of ethylene vinyl acetate copolymer and ethylene-methyl acrylate copolymer, flame retardant filler and crosslinking agent.

In addition, the present invention relates to a cable comprising a crosslinked layer obtained from said crosslinkable polymer composition, said crosslinked layer being more preferably a sheath layer.

BACKGROUND OF THE INVENTION

In order to provide flame retardancy to a cable bedding or sheath layer, halogen based compound or flame retardant filler has been used in the related art.

The Halogenated compound refers to a polymer comprising halogen atom. While the halogen based compound provides excellent flame retardancy regardless of kinds of resin, it has a problem of which it emits a large amount of toxic gases during the combustion.

To solve the problem and provide polymer composition with low smoke emission and flame retardant properties, flame retardant filler such as metal hydroxide has been used. However, there is a problem that a large amount of filler should be incorporated to the polymer in order to provide polymer with low smoke emission properties that is required for cable. However, a large amount of filler makes the mechanical properties of the composition, such as tensile strength or elongation at break, decreased significantly, and makes melt viscosity of the polymer composition decreased so that the processability of the polymer composition becomes to be worse, and thus the amount of filler that can be comprised in the polymer composition is limited.

Therefore, there still remains in the related art demands for crosslinkable polymer composition having low smoke emission and flame retardant properties that can be more particularly required for cable, while having appropriate level of mechanical properties.

PRIOR ART

[Patent Publication No. 1] EP 2447323 (published on May 5, 2012)

BRIEF DESCRIPTION OF THE INVENTION

It is an object of the present invention to provide a crosslinkable polymer composition, more particularly for use in a cable layer, having low smoke emission and flame retardant properties while having enhanced oil resistant properties.

It is another object of the present invention to provide a cable comprising crosslinked layer obtained from said crosslinkable polymer composition, said crosslinked layer being more preferably a sheath layer.

In order to achieve the object, the present invention provides a crosslinkable polymer composition, comprising:
   a polymer blend comprising ethylene vinyl acetate (EVA) copolymer and more than 50% by weight of ethylene methyl acrylate (EMA) copolymer;
   a flame retardant filler; and
   a crosslinking agent.

In one embodiment, said EVA copolymer has 40 to 60% by weight of vinyl acetate content.

In another embodiment, the polymer blend according to the present invention comprises EVA copolymer with an amount of 10 to 50 parts by weight with respect to 100 parts by weight of polymer blend, and EMA copolymer with an amount of 50 to 90 parts by weight with respect to 100 parts by weight of polymer blend.

In one preferable embodiment, the flame retardant filler is selected from the group consisting of an aluminum hydroxide ($Al(OH)_3$), a magnesium hydroxide ($Mg(OH)_2$), and a mixture thereof, and preferably, is an aluminum hydroxide. Preferably, the aluminum hydroxide can be coated with vinylsilane, fatty acid or amino polysiloxane.

Preferably, the crosslinking agent is dialkylperoxide.

In one preferable embodiment, the crosslinkable polymer composition according to present invention comprises flame retardant filler with an amount of 100 to 180 parts by weight with respect to 100 parts by weight of polymer blend, and crosslinking agent with an amount of 0.5 to 5 parts by weight with respect to 100 parts by weight of polymer blend.

In another preferable embodiment, the crosslinkable polymer composition according to the present invention comprises 100 parts by weight of polymer blend, 100 to 180 parts by weight of flame retardant filler, 0.5 to 5 parts by weight of crosslinking agent, 0.5 to 5 parts by weight of processing aid, and 0.1 to 5 parts by weight of antioxidant, the amount being expressed with respect to 100 parts by weight of polymer blend.

In addition, the present invention provides a cable comprising crosslinked layer obtained from the crosslinkable polymer composition according to the present invention, preferably said layer being a sheath layer.

In the present invention, the term "sheath layer" means more particularly the outermost layer of a cable or line.

ADVANTAGEOUS EFFECTS

The crosslinkable polymer composition according to the present invention has low smoke emission and flame retardant properties that are required for cable, while maintaining appropriate levels of mechanical properties, so that it can be used for preparing a sheath layer for a cable.

In addition, the crosslinkable polymer composition according to the present invention has enhanced oil resistance, so that the composition can be used for preparing a sheath layer of a cable to prevent the mechanical properties of sheath layer from being reduced when the cable is exposed under the environment in which oil has been exposed. Therefore, said composition can be applied to the field in which oil resistant properties of the cable are essential, such as, a drillship, offshore plant, and military submarines.

DETAILED DESCRIPTION OF THE INVENTION

Hereinafter, the invention will be described in more detail.

The crosslinkable polymer composition according to the present invention comprises a polymer blend; a flame retardant filler; and crosslinking agent.

Polymer Blend

The polymer blend according to the present invention comprises ethylene vinyl acetate copolymer and ethylene methyl acrylate copolymer.

The ethylene vinyl acetate (EVA) copolymer is a copolymer that is produced via polymerization of ethylene monomer and vinyl acetate monomer. The physical properties of EVA copolymer is determined depending on the degree of polymerization and content of vinyl acetate, and typically EVA provides good chemical-resistance, weather resistance, and ozone-resistance to the polymer composition according to the present invention. In a preferred embodiment, EVA copolymer according to the present invention has vinyl acetate content from 20 to 70% by weight, more preferably from 40 to 60% by weight. In another preferred embodiment, EVA copolymer according to the present invention can be comprised in the polymer blend in amount of not more than 50% by weight, more preferably 10 to 50% by weight, said amount being expressed based on 100% by weight of polymer blend.

The ethylene methyl acrylate (EMA) copolymer is a copolymer that is produced via polymerization of ethylene monomer and methyl acrylate monomer. Said ethylene methyl acrylate copolymer makes thermal resistance and oil resistance of the polymer composition according to the present invention increased. In a preferred embodiment, ethylene methyl acrylate copolymer according to the present invention can be comprised in the polymer blend in an amount of more than 50% by weight, more preferably 50 to 90% by weight, in which said amount being expressed with respect to 100% by weight of polymer blend.

Said ethylene methyl acrylate copolymer according to the present invention, in particular more than 50% by weight of EMA copolymer, that is blended with ethylene vinyl acetate, is added to the composition according to the present invention, and mixed with flame retardant filler, so that it can significantly reduce smoke and toxic gases released under combustion of cable, and increase oil resistant.

In one embodiment, the polymer composition of the present invention does not comprise halogenated compound. The halogenated compound can be a chlorinated polymer, such as polyvinylchloride, or fluorinated polymer. Since the composition according to the present invention does not comprise halogenated compound, it does not emit toxic gases such as halogenated hydrogen.

Flame Retardant Filler

In order to improve flame retardant properties of the polymer composition, flame retardant filler is comprised in said composition. Preferably, the flame retardant filler is an aluminum hydroxide ($Al(OH)_3$), a magnesium hydroxide ($Mg(OH)2$) or a mixture thereof. More preferably, it is an aluminum hydroxide. The flame retardant filler of the invention has an advantage that it releases less toxic gases under combustion compared to halogenated compound. In a preferred embodiment, the flame retardant filler of the invention is aluminum hydroxide coated with vinyl silane, fatty acid or aminopolysiloxane. Said coated aluminum hydroxide can improve mechanical properties and flame retardant properties of the polymer composition.

In a preferred embodiment, the content of said flame retardant filler is between 100 to 180 parts by weight with respect to 100 parts by weight of polymer blend.

Crosslinking Agent

The polymer composition according to the present invention comprises crosslinking agent. Said crosslinking agent makes the polymer composition crosslinked. In one embodiment, said crosslinking agent is peroxide crosslinking agent, in which bis (t-butylperoxyisopropyl)benzene (such as Perbutyl P) is included as a non-limited example.

In one embodiment, the content of the crosslinking agent is 0.5 to 5 parts by weight, preferably 1 to 5 parts by weight, more preferably 1 to 3 parts by weight, the amounts being expressed with respect to 100 parts by weight of polymer blend.

Other Additives

In one embodiment, the polymer composition according to the present invention may optionally further comprises antioxidant. The antioxidant can prevent polymer composition from oxidation, and enhance weather-resistant/thermoresistant properties. In a preferred embodiment, the antioxidant according to the present invention is selected from the group consisting of: amine based antioxidant (e.g., octylated diphenylamine, or 2,2,4-trimethyl-1,2-dihydroquinoline (TMQ)), polycarbodiimide antioxidant, and a combination thereof. Preferably, the antioxidant is a combination of diphenylamine and polycarbodiimide. In another preferred embodiment, the polymer composition according to the present invention comprises antioxidant in an amount of 0.1 to 5 parts by weight with respect to 100 parts by weight of polymer blend. More preferably, the composition comprises 0.1 to 1.5 parts by weight of diphenylamine, and 0.1 to 1.5 parts by weight of polycarbodiimide, with respect to 100 parts by weight of polymer blend.

In one another embodiment, the polymer composition according to the present invention may optionally further comprises processing aid, preferably with an amount of 0.5 to 5 parts by weight with respect to 100 parts by weight of polymer blend.

In addition, the polymer composition according to the present invention may optionally further comprises organic and/or inorganic additives. In one preferable embodiment, said organic additives is compatibilizer, plasticizer, pigments, coupling agents, or crosslinking aid agents. In another preferable embodiment, the inorganic additives is metal-based inorganic additives or ceramic-based inorganic additives such as carbon black, calcium carbonate ($CaCO_3$), talc, china clay, graphite, silica, mica, antimony trioxide, lead oxide, magnesium oxide, zinc oxide.

In one non-limited embodiment, the content of organic additives is 100 parts by weight or less, more preferably 500 parts by weight or less, with respect to 100 parts by weight of polymer blend. In addition, in another non-limited embodiment, the content of inorganic additives is 300 parts by weight or less, more preferably 150 parts by weight or less, the amounts being with respect to 100 parts by weight of polymer blend.

The crosslinkable polymer composition according to the present invention can be produced by mixing polymer blend, flame retardant filler and crosslinking agent, using for example two-roll mill. In addition, the aforementioned other additives, such as antioxidant, processing aid, inorganic additives and/or organic additives, may be further added to said mixture, depending on the particular properties industrially required to the crosslinkable polymer composition for sheath layer of cable.

Furthermore, said obtained crosslinkable polymer composition may be compressed in mold under high temperature so as to be crosslinked to form a crosslinked product. Preferably, said crosslinking procedure is performed under the temperature of preferably 150° C. or more, more preferably 150° C. to 220° C., and the pressure of preferably 12 to 22 MPa, more preferably 16 to 20 MPa by heating for example using water or inorganic salt as a thermal fluid.

In addition, the present invention provides a cable comprising crosslinked layer obtained from crosslinkable polymer composition according to the present invention, more particularly used as a sheath layer. Said sheath layer can be an inner sheath layer or an outer sheath layer. The inner sheath layer can be positioned between insulating layer and braid, and the outer sheath layer can be positioned at outermost part of the cable.

The cable according to the present invention has an outstanding low smoke emission properties and weather-resistant, oil-resistant and cold-resistant properties so that it can be applied to ship or offshore plant.

Hereinafter, the present invention is described in further detail in the following Examples which are not in any way intended to limit the scope of the invention as claimed. In addition, it will appear to a person skilled in the art that various modifications may be made to the disclosed Examples, and that such modifications are intended to be within the scope of the present invention.

EXAMPLES

Preparation of Crosslinkable Polymer Composition and its Crosslinked Product (Representative Example of Preparation)

As a representative example of the method for preparing a crosslinkable polymer composition and its crosslinked product according to the invention, the crosslinkable composition is prepared using the components and the mixing ratio as shown in Table 1.

TABLE 1

| Component | ratio(phr) |
|---|---|
| EVA (EVAFLEX 45LX) | 30 |
| EMA (Vamac DP) | 70 |
| aluminum hydroxide (Apyral 40CD) | 150 |
| antioxidant (Rhenofit DDA-70) | 1.0 |
| antioxidant (Rhenogran PCD-50) | 0.5 |
| organic processing aid (Armeen 18D) | 1.0 |
| dialkylperoxide (Perbutyl P) | 2.0 |

In the table 1, phr refers to parts by weight with respect to 100 parts by weight of polymer blend, the polymer blend in Table 1 being a blend of EVA and EMA.

Firstly, inventors mixed following components with the ratio disclosed in Table 1, using a two roll mill at 75° C. for 20 minutes:

EVA with a vinyl acetate content of 45.5% commercialized by Dupont Mitsui Polychemicals under the reference of EVAFLEX 45LX;
EMA commercialized by Dupont under the reference of Vamac DP;
aluminum hydroxide (having content of 99.5% and average particle size of 1.3 μm) commercialized by Nabaltec under the reference of Apyral 40CD;
diphenylamine (antioxidant) commercialized by Rhein-Chemie under the reference of Rhenofit DDA-70;
polycarbodiimide (antioxidant) commercialized by RheinChemie under the reference of Rhenogran PCD-50;
octadecanamine based compound (processing aid) commercialized by AkzoNobel under the reference of Armeen 18D;
Bis(t-butylperoxyisopropylbenzene) (crosslinking agent) commercialized by NOF under the reference of Perbutyl P.

The mixture thus obtained was compressed under the 170° C./15 MPa and crosslinked for a period of time of $t_{c90}$ defined below. And subsequently the pressure was released and the obtained composite was cooled in the air. As a result, the crosslinked product of crosslinkable polymer composition of the present invention was made.

The aforementioned $t_{c90}$ refers to a time taken to reach to 90% of the maximum ODR torque value, which is increased as the crosslinking reaction is occurred in the ODR (Oscillation disk rheometer) test under the condition as defined in ASTM D2084.

Evaluation Method for Mechanical Properties of Crosslinked Product of Polymer Composition The mechanical properties such as tensile strength (TS) and Elongation at break (EB) of crosslinked product were determined by preparing dumbbell-shaped specimen as defined in the standard DIN 53504.S2, and then using a universal tensile strength tester under the condition as defined in standard IEC 60811-1-1. When both values of the tensile strength and the elongation at break are higher, the mechanical properties are considered to be better on the whole.

Evaluation Method for Thermal-Resistant Properties of the Crosslinked Product of Polymer Composition In order to determine thermal resistant properties, said dumbbell-shaped specimen as defined in the standard DIN 53504.S2 was treated with the temperature of 120° C. for 168 hours, and then the tensile strength and Elongation at break of the specimen were measured. The thermal resistant properties was evaluated with a rate of change from before treatment to after treatment in tensile strength and elongation at break. When the rate of change in tensile strength and elongation at break are lower, the thermal resistant properties are considered to be better.

Evaluation Method for Oil-Resistant Properties of the Crosslinked Product of Polymer Composition In order to determine oil-resistant properties, said dumbbell-shaped specimen as defined in the standard DIN 53504.S2 was treated with IRM 903 paraffin based oil (distillates consisting of paraffinics and naphthenics, aniline point is between 69 to 71° C.) at 100° C. for 168 hours. And then, tensile strength, elongation at break and weight were measured. When the rate of change from before treatment to after treatment in tensile strength, elongation at break and weight is lower, the oil resistant properties is considered to be better.

Said specimen was also treated with EDC 96-11 paraffin based oil (distillates consisting of paraffinics and cyclic hydrocarbons, aniline point of 85~94° C.) at 70° C. for 336 hours, and then tensile strength, elongation at break, and weight were measured. When the rate of change from before treatment to after treatment in tensile strength, elongation at break, and weight is lower, the oil resistant properties is considered to be better.

Evaluation Method for Low Smoke Emission Properties of the Crosslinked Product of Polymer Composition In order to evaluate low smoke emission properties of the crosslinked product, smoke density (maximum smoke density, Dmax) was measured according to the standard ASTM E 662 (Heat flux: 25 kW/m2, Flaming mode condition, specimen: square sheep having the dimensions of width 75 mm, height 75 mm, depth 2 mm). When the maximum smoke density value (Dmax: Maximum specific optical density) is lower, the low smoke emission properties is considered to be better.

Total smoke released (TSR) was also measured according to the standard ASTM E 662 (Heat flux: 25 kW/m2, Flaming mode condition, specimen: square sheet having dimensions of width 75 mm, height 75 mm, depth 2 mm). When the Total smoke released value is lower, the low smoke emission is considered to be better.

Evaluating Method for Flame Retardant Properties of Crosslinked Product of the Polymer Composition In order to evaluate the flame retardant properties of crosslinked product, limited oxygen index (LOI) was measured according to the standard ASTM D2863 (type Iv specimen, having dimensions of height 150 mm, width 6 mm, depth 3 mm). When the value of limited oxygen index is higher, the flame retardant properties are considered to be better. The LOI value of sheath layer for line or cable is generally at least 32.

Properties Determined Using Different Polymer Compositions or their Crosslinked Products In order to identify aforementioned properties of the crosslinked product, polymer composition and its crosslinked product were prepared using the components and mixing ratio in Table 2 below according to the method that is described in the representative preparation example.

TABLE 2

|  | Example | | | | Comparative Example | | | |
| --- | --- | --- | --- | --- | --- | --- | --- | --- |
|  | 1 | 2 | 3 | 4 | 1 | 2 | 3 | 4 |
| EVA (EVAFLEX 45LX) | 70 | 50 | 30 | 10 | 100 | — | — | — |
| EMA (Vamac DP) | 30 | 50 | 70 | 90 | — | 100 | — | — |
| EVA (Levapren 700HV) [1] | — | — | — | — | — | — | 100 | — |
| EVA (EVATANE 28-05) [2] | — | — | — | — | — | — | — | 100 |
| Aluminum hydroxide (Apyral 40CD) | 150 | 150 | 150 | 150 | 150 | 150 | 150 | 150 |
| Rhenofit DDA-70 | 1 | 1 | 1 | 1 | 1 | 1 | 1 | 1 |
| Rhenogran PCD-50 | 0.5 | 0.5 | 0.5 | 0.5 | 0.5 | 0.5 | 0.5 | 0.5 |
| Armeen 18D | 1 | 1 | 1 | 1 | 1 | 1 | 1 | 1 |
| Perbutyl P | 2 | 2 | 2 | 2 | 2 | 2 | 2 | 2 |

In Table 2,
— phr refers to parts by weight with respect to 100 parts by weight of polymer blend, and the polymer blend in Table 2 is a blend of EVA and EMA.
[1] is EVA having vinyl acetate content of 70%, commercialized to Lanxess under the reference of Levapren 700 HV;
[2] is EVA having vinyl acetate of 27 to 29% commercialized by ARKEMA under the reference of EVATANE 28-05.

The mechanical properties, heat and oil resistance, smoke density and limited oxygen index of the crosslinked product thus obtained were measured according to the method described before. And the results are presented in the following Table 3.

TABLE 3

|  |  | Examples | | | | Comparative examples | | | |
| --- | --- | --- | --- | --- | --- | --- | --- | --- | --- |
|  |  | 1 | 2 | 3 | 4 | 1 | 2 | 3 | 4 |
| tensile strength (MPa) | | 5.7 | 5.4 | 4.8 | 5.1 | 6.9 | 5.4 | 4.3 | 7.4 |
| elongation at break (%) | | 553 | 583 | 609 | 712 | 524 | 555 | 538 | 525 |
| Heat resistance (rate of change) | Tensile strength (%) | −9 | −17 | −5 | −3 | −25 | 4 | 15 | 0 |
| | Elongation at break (%) | −5 | −21 | −24 | −13 | −4 | −9 | −5 | 4 |
| IRM 903 oil resistance (rate of change) | Tensile strength (%) | −40 | −19 | 3 | 2 | −63 | 26 | 46 | −16 |
| | Elongation at break (%) | −16 | −15 | −8 | −1 | −26 | 5 | 17 | −18 |
| | Weight (%) | 51 | 43 | 36 | 29 | 70 | 25 | 15 | 117 |
| EDC 95-11 oil resistance (rate of change) | Tensile strength (%) | 11 | 23 | 22 | 8 | −39 | 7 | 22 | 9 |
| | Elongation at break (%) | −9 | −11 | −4 | −6 | −9 | −2 | 6 | −5 |
| | weight (%) | 17 | 13 | 11 | 8 | 24 | 6 | 5 | 31 |
| Smoke density | Dmax | 51.0 | 52.1 | 45.7 | 64.8 | 66.0 | 73.9 | 72.8 | 76.2 |
| | TSR (m²/m²) | 420.3 | 462.3 | 266.5 | 542.7 | 536.0 | 603.8 | 579.0 | 668.9 |
| Limited oxygen index (%) | | 32.1 | 33.4 | 32.1 | 32.2 | 32.9 | 32.4 | 41.1 | 32.2 |

As shown in Table 3, the crosslinked products according to examples 1 to 4 shows lower smoke density compared to the product according to the comparative examples 1 to 4. In particular, from the results of the examples 3 to 4, it is shown that the smoke emission during the combustion of EVA/EMA blend can be significantly reduced by using polymer blend comprising 50 to 90% by weight of ethylene methyl acrylate copolymer.

In addition, the crosslinked product comprising more than 50% of EMA copolymer according to examples 3 to 4, shows enhanced oil-resistant properties compared with that of comparative example 1.

Furthermore, all crosslinked products of examples 1 to 4 according to the present invention satisfy required limited oxygen index for sheath layer of cable or line.

The invention claimed is:

1. A crosslinkable polymer composition, comprising:
   a polymer blend comprising ethylene vinyl acetate (EVA) copolymer and more than 50% by weight of ethylene methyl acrylate (EMA) copolymer;
   a flame retardant filler; and
   a crosslinking agent, wherein the crosslinking agent is dialkylperoxide and the EVA copolymer has 40 to 60% by weight of vinyl acetate content.

2. The crosslinkable polymer composition according to claim 1, wherein the polymer blend comprises EVA copolymer in an amount of 10 to 49 parts by weight with respect to 100 parts by weight of polymer blend, and EMA copolymer in an amount of 51 to 90 parts by weight with respect to 100 parts by weight of polymer blend.

3. The crosslinkable polymer composition according to claim 1, wherein the flame retardant filler is an aluminum hydroxide ($Al(OH)_3$) or a magnesium hydroxide ($Mg(OH)_2$).

4. The crosslinkable polymer composition according to claim 3, wherein the flame retardant filler is an aluminum hydroxide coated with vinylsilane, fatty acid or amino polysiloxane.

5. The crosslinkable polymer composition according to claim 1, wherein said crosslinkable polymer composition comprises flame retardant filler in an amount of 100 to 180 parts by weight with respect to 100 parts by weight of polymer blend, and crosslinking agent with an amount of 0.5 to 5 parts by weight with respect to 100 parts by weight of polymer blend.

6. The crosslinkable polymer composition according to claim 1, wherein said crosslinkable polymer composition comprises 100 parts by weight of polymer blend, 100 to 180 parts by weight of flame retardant filler, 0.5 to 5 parts by weight of crosslinking agent, and further comprises 0.5 to 5 parts by weight of processing aid, and 0.1 to 5 parts by weight of antioxidant, the amounts being expressed with respect to 100 parts by weight of polymer blend.

7. A sheath layer comprising a cable comprising crosslinked layer obtained from the crosslinkable polymer composition according to claim 1.

* * * * *